United States Patent
Nakamura et al.

[11] Patent Number: 5,862,839
[45] Date of Patent: Jan. 26, 1999

[54] METHOD AND APPARATUS FOR FILLING LIQUID CRYSTAL MATERIAL

[75] Inventors: Chihiro Nakamura, Moriguchi; Kiyohiko Kitagawa, Hirakata; Takafumi Kaneda, Katano; Susumu Matsuoka, Hirakata; Tsukasa Hashimoto, Higashiosaka; Tomoya Maeda, Neyagawa, all of Japan

[73] Assignee: Matsushita Electric Industrial Co., Ltd., Kadoma, Japan

[21] Appl. No.: 787,713

[22] Filed: Jan. 24, 1997

[30] Foreign Application Priority Data

Jan. 26, 1996 [JP] Japan ................... 8-012260
Feb. 9, 1996 [JP] Japan ................... 8-024209

[51] Int. Cl.$^6$ ................................. B65B 31/02
[52] U.S. Cl. ................. 141/7; 141/4; 141/65; 141/237; 141/239; 349/154
[58] Field of Search ................. 141/4, 5, 6, 7, 141/8, 21, 31, 63, 65, 237, 239, 113; 349/189, 154

[56] References Cited

U.S. PATENT DOCUMENTS

| | | | |
|---|---|---|---|
| 1,778,888 | 10/1930 | Davis | 141/239 |
| 4,099,550 | 7/1978 | Matsuzaki et al. | 141/237 |
| 5,029,623 | 7/1991 | Brosig | 141/7 |
| 5,269,351 | 12/1993 | Yoshihara | 141/7 |
| 5,359,442 | 10/1994 | Tanaka et al. | |
| 5,399,114 | 3/1995 | Park | |
| 5,477,349 | 12/1995 | Fujiwara | |

FOREIGN PATENT DOCUMENTS

| | | |
|---|---|---|
| 26 46 637 | 5/1977 | European Pat. Off. |
| 59-009629 | 1/1984 | Japan |
| 59-198426 | 11/1984 | Japan |
| 62-115122 | 5/1987 | Japan |

Primary Examiner—Steven O. Douglas
Attorney, Agent, or Firm—Wenderoth, Lind & Ponack, L.L.P.

[57] ABSTRACT

A liquid crystal material filling apparatus which includes, in a vacuum chamber, a liquid crystal pot having a liquid crystal reservoir for storing a liquid crystal material. A groove part is coupled with the liquid crystal reservoir at a certain angle and contains a medium for holding the liquid crystal material. A filling jig cassette is provided to accommodate a plurality of liquid crystal panels having injection ports faced downwardly, and an elevation device is provided for moving the liquid crystal pot up and down. Also, a posture control mechanism is provided for switching a posture of the liquid crystal pot in accordance with the up/down movement of the liquid crystal pot thereby to cause the liquid crystal material to flow from the liquid crystal reservoir to the groove part at a raised position and bring the medium in touch with lower faces of the injection ports of the liquid crystal panels.

18 Claims, 8 Drawing Sheets

METHOD AND APPARATUS FOR FILLING LIQUID CRYSTAL MATERIAL

BACKGROUND OF THE INVENTION

The present invention relates to a method and an apparatus for filling a liquid crystal material to liquid crystal panels (panel cells).

A dipping method has been employed to inject and fill a liquid crystal material to liquid crystal panels heretofore.

A conventional liquid crystal filling apparatus is shown in FIG. 4. A plurality of liquid crystal panels 1 are accommodated in a filling jig cassette 18 of the apparatus with injection ports 1a thereof faced down. A constant amount of a liquid crystal material 11 is stored in a liquid crystal pot 20. Both the filling jig cassette 18 and the liquid crystal pot 20 are placed in a vacuum chamber 19 so that the liquid crystal panels 1 are held out of touch with the liquid crystal material 11.

The vacuum chamber 19 is first reduced to at least about $10^{-3}$ to about $10^{-4}$ Torr, whereby air dissolved in the liquid crystal material 11 stored in the liquid crystal pot 20 is degassed. After the air in the liquid crystal material 11 is degassed sufficiently, the pot 20 is raised by an elevation device 17 and stopped at a position where lower parts of the liquid crystal panels 1 fully immersed in the pot.

Thereafter, $N_2$ gas is introduced into the vacuum chamber 19, thereby to raise the chamber to an atmospheric pressure. In consequence, the liquid crystal material 11 in the pot 20 is pressed out by the pressure and injected/filled through the injection ports 1a to the liquid crystal panels kept still in the vacuum state inside. When all of the liquid crystal panels 1 are filled with the liquid crystal material 11, the liquid crystal pot 20 is lowered and the filling jig cassette 18 is taken out of the vacuum chamber 19. The filling is completed in this manner.

According to the above method and apparatus for filling the liquid crystal material to liquid crystal panels, a larger amount of the liquid crystal material than required should be stored beforehand in the pot so as to prevent the mixture of bubbles into the liquid crystal panels in the middle of the filling operation which would result from the lack of the liquid crystal material.

The liquid crystal material is contaminated and turned unusable after repeated filling operations. This is a waste of the expensive liquid crystal material.

Since the lower ends of the liquid crystal panels after the filling operation are totally wet with the liquid crystal material, the liquid crystal panels should be swabbed and cleaned afterwards, which requires a significant amount of time and cost.

SUMMARY OF THE INVENTION

An object of the present invention is therefore to provide a method and an apparatus whereby a swabbing process and a cleaning process for liquid crystal panels are simplified and unnecessary or extra liquid crystal material is reduced.

In accomplishing these and other objects, according to a first aspect of the present invention, there is provided a method for filling a liquid crystal material to liquid crystal panels, comprising bringing a medium holding a liquid crystal material into touch with downward-directed faces of injection ports of liquid crystal panels in a vacuum chamber and then filling the liquid crystal panels.

According to a second aspect of the present invention, there is provided a liquid crystal material filling method according to the first aspect, wherein in the bringing the medium into touch with the injection ports, the medium is constituted of a plurality of coil-like members having axial centers in a direction intersecting the injection ports of the liquid crystal panels.

According to a third aspect of the present invention, there is provided a liquid crystal material filling method according to the first aspect, wherein in the bringing the medium into touch with the injection ports, the medium is constituted of a plurality of coil-like members having top faces in touch with the injection ports of the liquid crystal panels.

According to a fourth aspect of the present invention, there is provided a liquid crystal material filling method according to the third aspect, wherein in the bringing the medium into touch with the injection ports, each of the coil-like members is a coil spring.

According to a fifth aspect of the present invention, there is provided an apparatus for filling a liquid crystal material, which comprises, in a vacuum chamber, a liquid crystal pot having a liquid crystal reservoir for storing a liquid crystal material and a groove part communicated with the liquid crystal reservoir at a certain angle in which a medium for holding the liquid crystal material is arranged, a filling jig cassette accommodating a plurality of liquid crystal panels with injection ports faced down, an elevation device for moving the liquid crystal pot up and down, and a posture control mechanism which switches a posture of the liquid crystal pot in accordance with up-and-down movement of the liquid crystal pot thereby to flow the liquid crystal material from the liquid crystal reservoir to the groove part at a raised position and bring the holding medium in touch with downward-directed faces of the injection ports of the liquid crystal panels.

According to a sixth aspect of the present invention, there is provided a liquid crystal material filling apparatus according to the fifth aspect, wherein a gate is provided between the liquid crystal reservoir and the groove part to regulate circulation of the liquid crystal material therebetween.

According to a seventh aspect of the present invention, there is provided a liquid crystal material filling apparatus according to the fifth aspect, which includes a stirring device for stirring and degassing the liquid crystal material stored in the liquid crystal reservoir.

According to an eighth aspect of the present invention, there is provided a liquid crystal material filling apparatus according to the sixth aspect, which includes a stirring device for stirring and degassing the liquid crystal material stored in the liquid crystal reservoir.

According to a ninth aspect of the present invention, there is provided an apparatus for filling a liquid crystal material, which comprises, in a vacuum chamber, a liquid crystal pot having a liquid crystal reservoir for storing a liquid crystal material and a groove part communicated with the liquid crystal reservoir and having a bottom face higher than a bottom face of the liquid crystal reservoir in which a medium for holding the liquid crystal material is arranged, a filling jig cassette accommodating a plurality of liquid crystal panels with injection ports faced down, a moving device for relatively moving up and down the liquid crystal pot and the liquid crystal panels, and a plunger which can move in and output of the liquid crystal reservoir and flows the liquid crystal material from the liquid crystal reservoir to the groove part when entering the reservoir.

According to a tenth aspect of the present invention, there is provided a liquid crystal material filling apparatus according to the ninth aspect, wherein the plunger works also as a stirring device for stirring and degassing the liquid crystal material stored in the liquid crystal reservoir.

According to an 11th aspect of the present invention, there is provided a liquid crystal material filling apparatus according to the ninth aspect, wherein the bottom face of the groove part is inclined to a horizontal plane, so that the liquid crystal material in the groove part returns to the liquid crystal reservoir by its own weight when the plunger is removed from the liquid crystal reservoir.

According to a 12th aspect of the present invention, there is provided a liquid crystal material filling apparatus according to the tenth aspect, wherein the bottom face of the groove part is inclined to a horizontal plane, so that the liquid crystal material in the groove part returns to the liquid crystal reservoir by its own weight when the plunger is removed from the liquid crystal reservoir.

According to a 13th aspect of the present invention, there is provided a liquid crystal material filling apparatus according to the ninth aspect, wherein a gap is provided between the bottom face of the groove part and a lower face of the medium so as to facilitate circulation of the liquid crystal material.

According to a 14th aspect of the present invention, there is provided a liquid crystal material filling apparatus according to the tenth aspect, wherein a gap is provided between the bottom face of the groove part and a lower face of the medium so as to facilitate circulation of the liquid crystal material.

According to a 15th aspect of the present invention, there is provided a liquid crystal material filling apparatus according to the fifth aspect, wherein the holding medium is constituted of a plurality of coils having axial centers in a direction intersecting the injection ports of the liquid crystal panels.

According to a 16th aspect of the present invention, there is provided a liquid crystal material filling apparatus according to the ninth aspect, wherein the holding medium is constituted of a plurality of coils having axial centers in a direction intersecting the injection ports of the liquid crystal panels.

According to a 17th aspect of the present invention, there is provided a liquid crystal material filling apparatus according to the 13th aspect, wherein the holding medium is constituted of a plurality of coils having axial centers in a direction intersecting the injection ports of the liquid crystal panels.

According to an 18th aspect of the present invention, there is provided a liquid crystal material filling apparatus according to the fifth aspect, wherein the holding medium is constituted of a plurality of coil-like members having top faces in touch with the injection ports of the liquid crystal panels.

According to a 19th aspect of the present invention, there is provided a liquid crystal material filling apparatus according to the ninth aspect, wherein the holding medium is constituted of a plurality of coil-like members having top faces in touch with the injection ports of the liquid crystal panels.

According to a 20th aspect of the present invention, there is provided a liquid crystal material filling apparatus according to the 13th aspect, wherein the holding medium is constituted of a plurality of coil-like members having top faces in touch with the injection ports of the liquid crystal panels.

According to a 21st aspect of the present invention, there is provided a liquid crystal material filling apparatus according to the 18th aspect, wherein each of the coil-like members is a coil spring.

According to a 22nd aspect of the present invention, there is provided a liquid crystal material filling apparatus according to the 19th aspect, wherein each of the coil-like members is a coil spring.

According to a 23rd aspect of the present invention, there is provided a liquid crystal material filling apparatus according to the 20th aspect, wherein each of the coil-like members is a coil spring.

According to a 24th aspect of the present invention, there is provided a liquid crystal material filling apparatus according to the 23rd aspect, wherein the coil spring is screwed in a supporting plate which is in turn held in the groove part.

According to a 25th aspect of the present invention, there is provided a liquid crystal material filling apparatus according to the fifth aspect, wherein a top of the medium is higher than upper faces of side walls of the groove part.

According to a 26th aspect of the present invention, there is provided a liquid crystal material filling apparatus according to the ninth aspect, wherein a top of the medium is higher than upper faces of side walls of the groove part.

According to a 27th aspect of the present invention, there is provided a liquid crystal material filling apparatus according to the fifth aspect, wherein a width of an opened groove face of the groove part is wider than a width of a downward-directed face of the injection port of the liquid crystal panel.

According to a 28th aspect of the present invention, there is provided a liquid crystal material filling apparatus according to the ninth aspect, wherein a width of an opened groove face of the groove part is wider than a width of a downward-directed face of the injection port of the liquid crystal panel.

The medium holding the liquid crystal material may be of any kind and in any form so long as it supplies the holding liquid crystal material into the liquid crystal panels from the lower faces of the injection ports in touch therewith. However, a plurality of coil-like means with axial centers set in a direction intersecting the injection ports is preferable. Many coil-like means having top faces thereof held in touch with the injection ports of the liquid crystal panels are preferably used as the above medium. One that is substantially the same as a coil and obtained by arranging many rings in a longitudinal direction in parallel to each other and coupling by a coupling wire, or the like is included in the above coil-like object, other than a coil. Moreover, a porous material object, e.g., a sponge or the like may be used as the medium.

According to the liquid crystal material filling method and apparatus of the present invention, since the liquid crystal material can be brought in touch with only the injection ports of the liquid crystal panels in the vacuum chamber, a waste of the liquid crystal material is eliminated and a swabbing and a cleaning processes for the liquid crystal panels can be simplified.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1A:
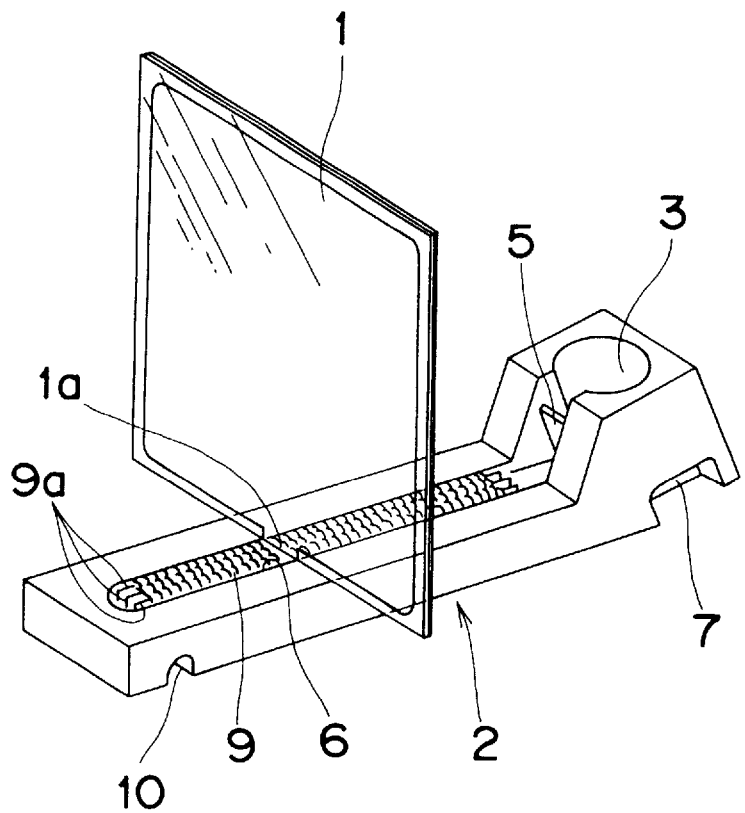
FIGS. 1A and 1B are perspective views of a liquid crystal pot in accordance with a first embodiment of the present invention and a gate.
Figure 1B:
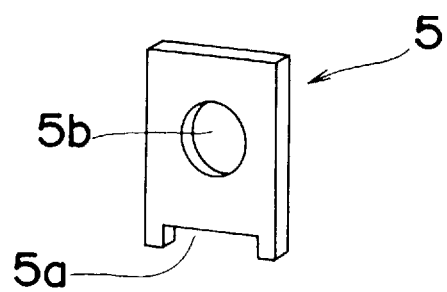

Before the description of the present invention proceeds, it is to be noted that like parts are designated by like reference numerals throughout the accompanying drawings.

A first embodiment of the present invention will be described with reference to FIGS. 1A–3.

A liquid crystal pot 2, shown in FIGS. 1A, 1B, and 2A–2C, is constituted of a liquid crystal reservoir 3 in which a necessary amount of a liquid crystal material 11 is stored, a slim or narrow groove part 6 integrally formed with the reservoir 3 at a certain angle, and a gate 5 for regulating the circulation of the liquid crystal material between the reservoir 3 and groove part 6.

Figure 2A:
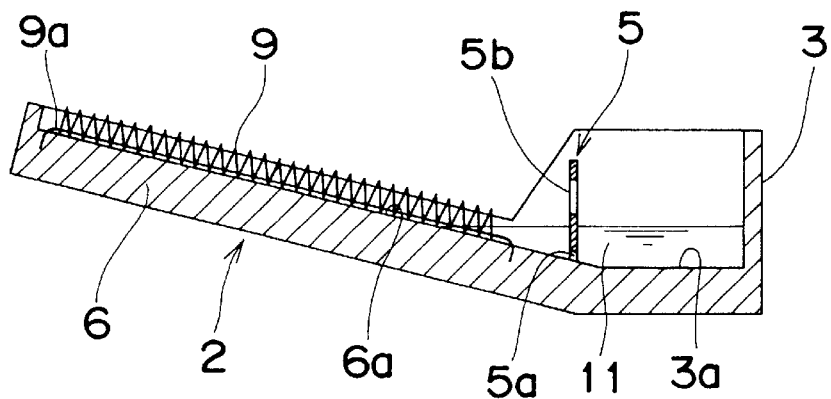
FIGS. 2A, 2B, and 2C are longitudinal sectional views and a lateral sectional view showing a schematic constitution of the liquid crystal pot and a positional relationship with a liquid crystal panel at a filling time in the first embodiment of the present invention.
Figure 2B:
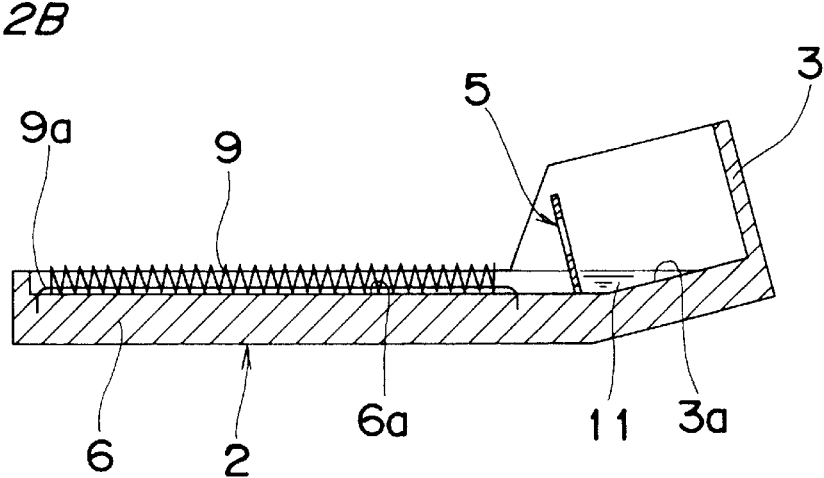

A bottom face 3a of the reservoir 3 and a bottom face 6a of the groove part 6 are bent and connected with each other at a bending angle of approximately 165° (at any angle in the range of 175°–155°) as indicated in FIGS. 2A and 2B. The gate 5 is disposed in a circulation path between the reservoir 3 and groove part 6. The gate 5 has a cutaway portion 5a and a hole 5b for passing the liquid crystal material through the hole 5b and the cutaway 5a between the groove part 6 and the reservoir 3 without overflowing outside of the pot 2. The liquid crystal material 11 is allowed to flow through a space defined by the cutaway 5a of the gate 5 and the bottom face 6a of the groove part 6. A resistance of the path can be adjusted by adjusting the position or opening degree of the gate 5. That is, when the gate 5 is inserted into the base part of the groove part 6 close to the reservoir 3, the insertion amount of the gate 5 can be varied in order to change the size of the space defined by the cutaway 5a of the gate 5 and the bottom face 6a of the groove part 6 so as to regulate the flow amount of the liquid crystal material passing through the space. A required filling amount of the liquid crystal material 11 is stored in the reservoir 3. The liquid crystal material 11 is supplemented in accordance with the consumption thereof when filled into liquid crystal panels 1. An automatic liquid crystal material supply device (not shown) is preferably used to supplement the material. It is convenient in order to correctly set the supplementation amount if the liquid crystal reservoir 3 is formed so as to be narrow and deep with a small cross sectional area. That is, the level of the liquid crystal material in the reservoir 3 is detected by a sensor, and then the consumed amount of the liquid crystal material is detected. The automatic liquid crystal material supply device supplies the material 11 in accordance with the detected and consumed amount of the material 11 to the reservoir 3.

The groove part 6 has a U-shaped cross section which is relatively shallow and thin.

Figure 2C:
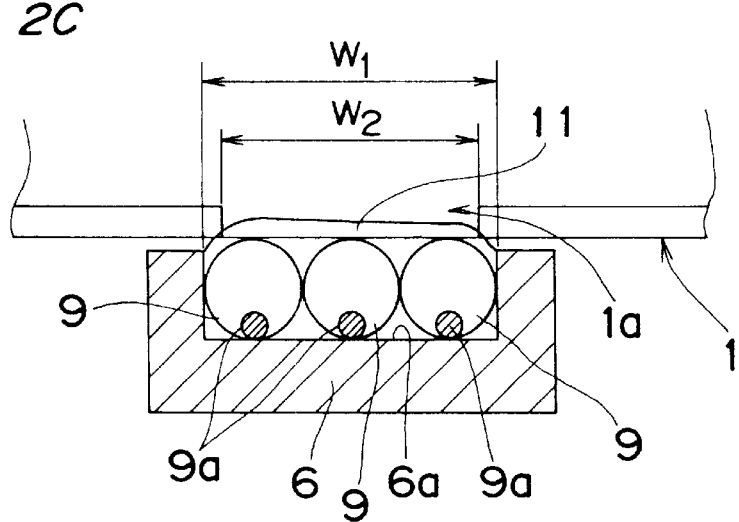

Three coils 9 (medium for holding the liquid crystal material), each having a central axis directed in the same direction as a longitudinal direction of the groove part 6, are arranged in parallel to each other in the groove part 6. A supporting wire 9a is inserted inside each coil 9, with both end parts bent downward and fixedly inserted in the bottom face 6a of the groove part 6, thereby to hold the coil 9. A top of each coil 9 projects slightly above upper faces of side walls of the groove part 6 as shown in FIG. 2C.

Although it is preferable to form the above liquid crystal pot 2, gate 5, supporting wires 9a, and coils 9 by SUS304 in the Japanese Industrial Standard, any material or any surface treatment may be used so long as the quality of the liquid crystal panels 1 and the liquid crystal material 11 is ensured.

A diameter, a pitch, and an outer diameter of the coil 9, and the number of the coils 9, a width and depth of the groove part 6, and the like are suitably determined from the viewpoint of whether the liquid crystal material 11 is held sufficiently, whether the coils 9 fit the shape of injection ports 1a of the liquid crystal panels 1, etc.

Figure 3:
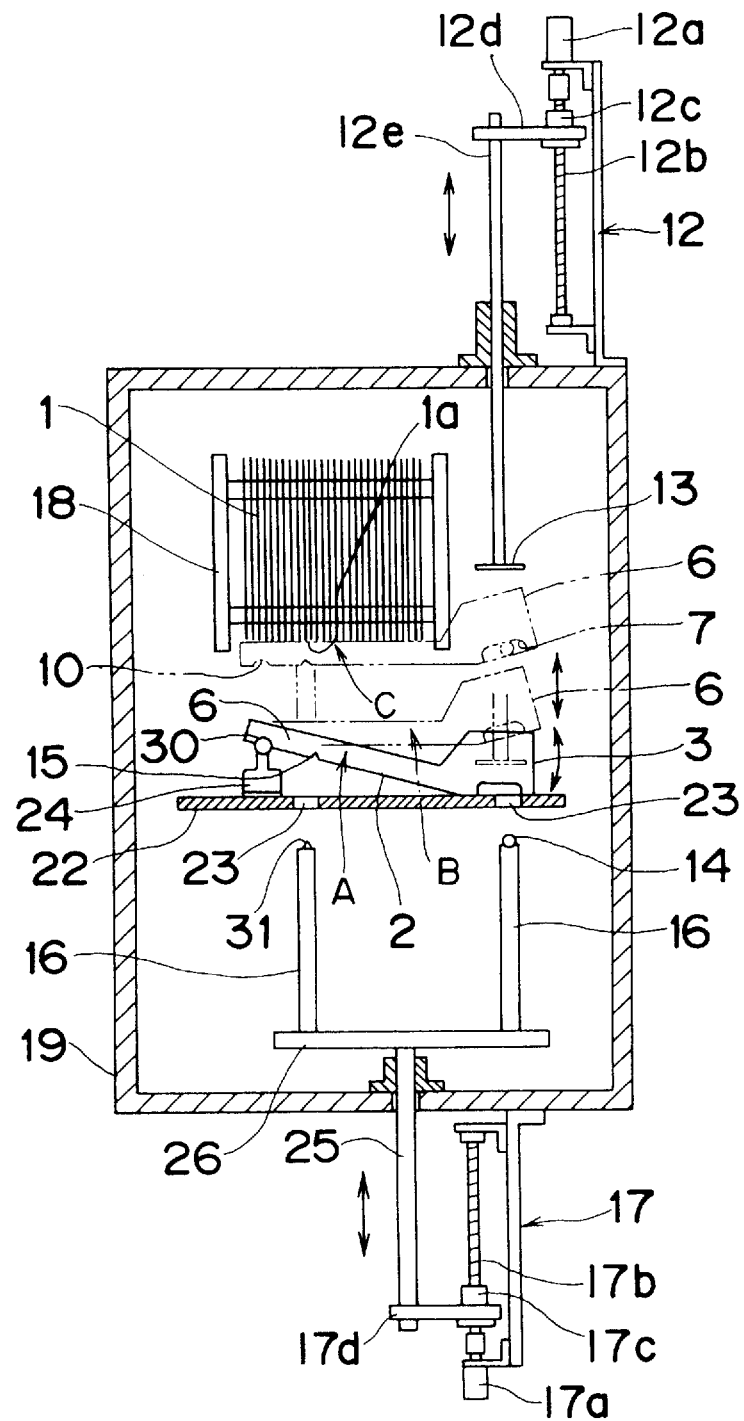
FIG. 3 is a sectional view of a liquid crystal filling apparatus in the first embodiment of the present invention.
Figure 4:
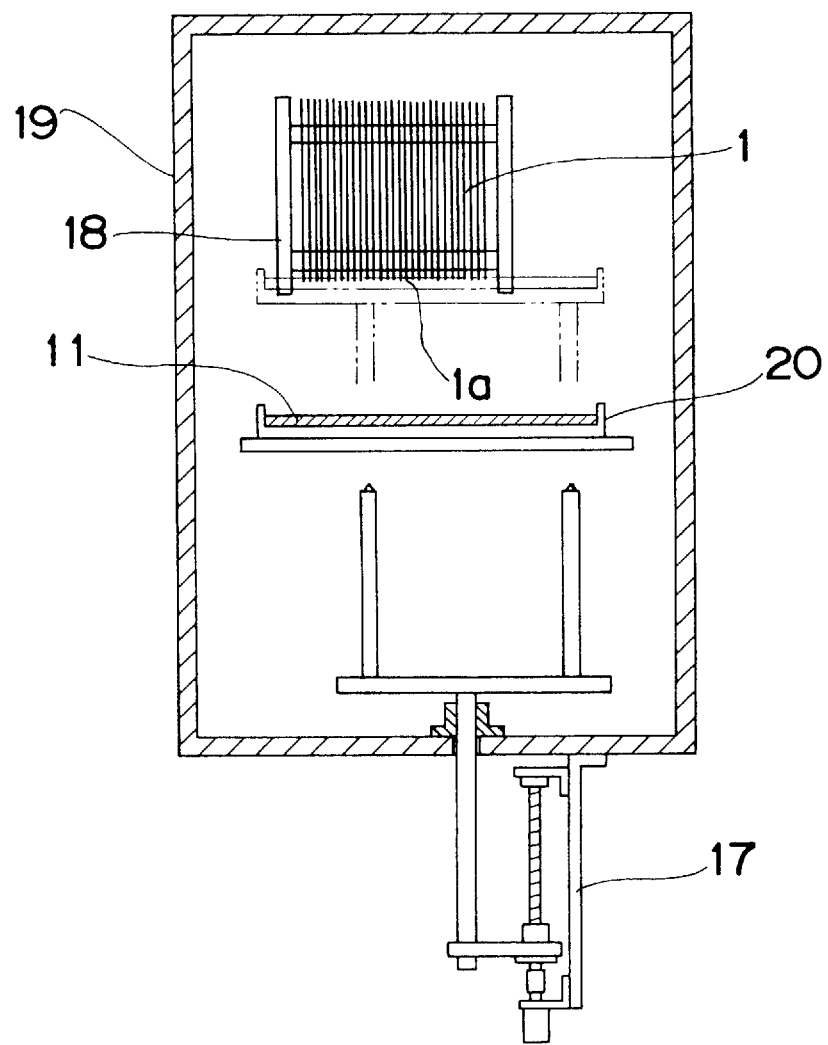
FIG. 4 is a sectional view of a conventional liquid crystal filling apparatus.

FIG. 3 is a liquid crystal material filling apparatus. The above-described liquid crystal pot 2 containing the liquid crystal material 11 and a filling jig cassette 18 holding a plurality of liquid crystal panels 1 with the injection ports 1a faced down are set in a vacuum chamber 19 of the apparatus. Before a filling operation is started, as designated by A in FIG. 3, the liquid crystal pot 2 is placed on a stage 22 fixed inside the vacuum chamber 19 so as to keep the bottom face 3a of the reservoir 3 horizontal position. On the other hand, the groove part 6 is supported by a roll 30 set at an upper end of a base 24 in a manner so as to be rotatable or pivotable about the axis of the roll 30. The base is fixed on the stage 22.

In an elevation device 17, a horizontal elevation table 26 is fixed to a main shaft 25 which can slide up and down penetrating a bottom wall of the vacuum chamber 19 airtightly. Four elevation driving shafts 16 of an equal length are fixed to the elevation table 26 at positions corresponding to vertices of a rectangle of the table 26. Two of the four driving shafts 16, on the right side in FIG. 3, have rollers 14 at respective front ends, while the two shafts on the left side are formed to project at respective front ends as conical projections 31. The elevation device 17 has a motor 17a for rotating a screw shaft 17b in both directions so as to move up and down a nut member 17c engaged with the screw shaft 17b together with a plate 17d fixed to the nut member 17c and projecting the main shaft 25 having the elevation table 26 at its upper end.

A through hole 23 is provided in the stage 22 on an extension line of an axial center of each driving shaft 16 so as to allow the shaft 16 to pass freely therethrough. A groove 10 having a semicircular cross section is formed in a lower face of the liquid crystal pot 2, more specifically, in the vicinity of an end part of the liquid crystal pot 2 at the side of the groove part 6. The roll 30 is detachably fitted in the groove 10. Moreover, the above rollers 14 contact the lower face of the liquid crystal pot 2 at the side of the reservoir 3 where a pair of roller reception recesses 7 allowing the rotation of the rollers 14 in a predetermined range are formed. Also a pair of conical recesses 15 to be engaged with the above-described conical projections 31 are formed in the lower face of the liquid crystal pot 2 at the side of the groove part 6 at a halfway point between the groove 10 and roller reception recesses 7.

A stirring plate 13 is arranged in the vacuum chamber 19 to stir the liquid crystal material 11 inside the reservoir 3. The stirring plate 13 can be moved up and down by an elevation device 12. The elevation device 12 has a motor 12a for rotating a screw shaft 12b in both directions so as to move up and down a nut member 12c engaged with the screw shaft 12b together with a plate 12d fixed to the nut member 12c and projecting a stirring shaft 12e having the stirring plate 13 at its lower end. This stirring plate 13 stirs the liquid crystal material 11 while repeatedly moving up and down in the reservoir 3 in accordance with the rotations of the screw shaft 12b. Alternatively, the stirring plate may be designed to turn about the axis of the stirring shaft 12e thereby to stir the liquid crystal material 11. Although SUS304 is preferably used to form the stirring plate, any material or any surface treatment is employable so long as it secures the quality of the liquid crystal panels 1 and the liquid crystal material 11.

Hereinbelow the operation of the apparatus in the above construction will be discussed.

Initially, the liquid crystal pot 2 is set in the vacuum chamber 19 in a state as shown in FIG. 2A and by A in FIG. 3, that is, with the bottom face 3a of the reservoir 3 maintained in a horizontal position and the bottom face 6a of the groove part 6 inclined approximately 15° upward. The liquid crystal material 11 is placed in the reservoir 3. In addition, the liquid crystal pot 2 is separated from the liquid crystal panels 1.

The vacuum chamber 19 is vacuumized from the above state. Since only a front face of the liquid crystal material 11 in the reservoir 3 is degassed in the above state, the stirring plate 13 is moved down by the elevation device 12 so as to be inserted into the reservoir 3. The liquid crystal material 11 is fully degassed by repeatedly moving the stirring plate 13 up and down. The degassing is promoted further if the stirring plate 13 is in touch with the bottom face 3a of the reservoir 3, and therefore a floating structure is preferably adopted.

Figure 8A:
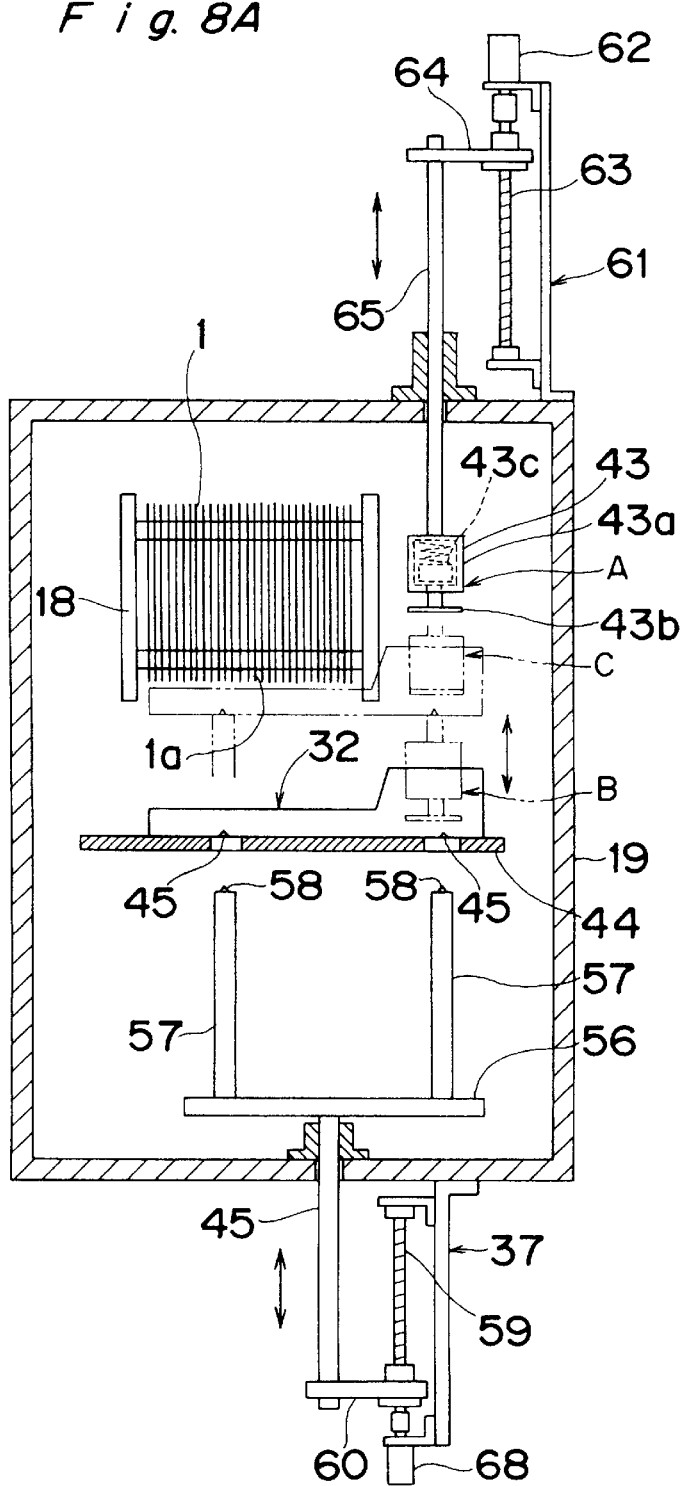
FIGS. 8A, 8B, and 8C are a sectional view of a liquid crystal filling apparatus in the second embodiment of the present invention, a perspective view and a cross-sectional view of a plunger thereof, respectively.
Figure 8B:
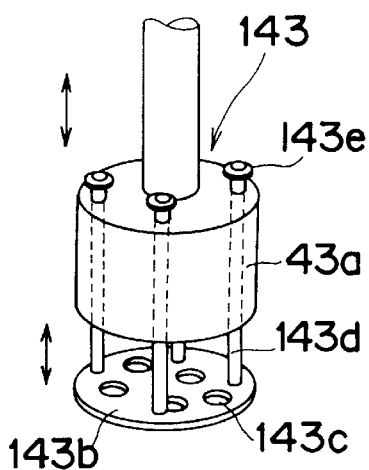
Figure 8C:
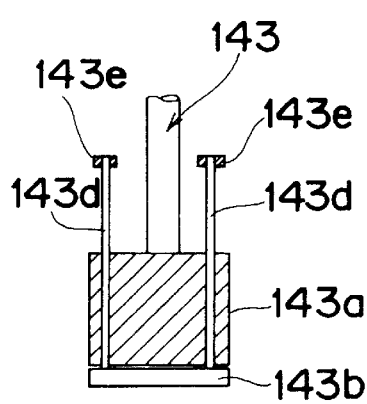

One example of the floating structure is shown in FIGS. 8B and 8C. This floating structure includes a piston 43a supported by the stirring shaft 12e, a plurality of support shafts 143d penetrate the piston 43a so as to freely move up and down and having stoppers 143e at their upper ends for preventing the support shaft 143d from dropping from the piston 43a, and a floating plate 143b fixed to lower ends of the support shafts 143d and having holes 143c, so that the liquid crystal material 11 can be moved through the holes 143c of the floating plate 143b while the stirring shaft 12e moves up and down together with the piston 43a. At this time, since the floating plate 143b is simply supported by the stoppers 143e of the support shafts 143d at the upper surface of the piston 43a via the support shafts 143d, the floating plate 143b can freely move up and down in the liquid crystal material 11. Even when the floating plate 143b contacts the bottom of the reservoir 3, the floating plate 143b moves up to prevent the reservoir 3 from being damaged.

When the liquid crystal material 11 is fully degassed and the vacuum in chamber 19 is decreased to at least approximately $10^{-3}$ or $10^{-4}$ Torr, the stirring plate 13 is raised and the liquid crystal pot 2 is moved up by the elevation device 17.

When the main shaft 25 of the elevation device 17 moves upward, the two shafts 16 with the rollers 14 among the four driving shafts 16 on the elevation table 26 contact the roller reception recesses 7 of the liquid crystal pot 2 earlier than the other two shafts 16. In accordance with the further upward motion of the main shaft 25, the liquid crystal pot 2 is subject to rotation in the counterclockwise direction in the drawing, and consequently is raised at the side of the liquid crystal reservoir 3, whereby the bottom face 6a of the groove part 6 becomes horizontal. Simultaneously with this, the conical projections 31 at the front ends of the remaining driving shafts 16 are engaged with the conical recesses 15 in the lower face of the liquid crystal pot 2.

The above state is represented in FIG. 2B and by B in FIG. 3. Before and after this state, while the liquid crystal material 11 in the reservoir 3 flows to the groove part 6 through the cutaway 5a of the gate 5, a flow rate of the liquid crystal material 11 is suitably regulated by the gate 5. The liquid crystal material 11 is filled into the three coils 9 arranged in the groove part 6. In this case, the top of each coil 9 is exposed a constant height from the both upper faces of the side walls of the groove part 6. Therefore, even when the liquid crystal material 11 has a relatively small surface tension, the liquid crystal material 11 swells over an upper end of the groove part 6 as shown in FIG. 2C. The coil 9 thus works as a medium for holding the liquid crystal material 11.

When the four driving shafts 16 move up further, the groove 10 is separated from the roll 30 and the liquid crystal pot 2 moves up while maintaining its posture shown in FIG. 2B. Finally, as indicated by C in FIG. 3, the coils 9 come in touch with the injection ports 1a of the liquid crystal panels 1, when the elevation device 17 is stopped.

The liquid crystal material is started to be filled. After the filling of the material 11 for a fixed time through the capillary phenomenon, $N_2$ is supplied into the vacuum chamber 19, so that the vacuum chamber 19 is returned to the atmospheric pressure. A liquid level of the liquid crystal pot 2 is pressed by the atmospheric pressure and hence the liquid crystal material 11 is gradually filled into the liquid crystal panels 1.

At this time, although the amount of the liquid crystal material 11 present in the groove part 6 is limited, the liquid crystal material 11 corresponding to the reduced amount is naturally supplemented from the reservoir 3 by the automatic liquid crystal material supply device until the liquid crystal panels 1 are completely filled with the liquid crystal material 11. Since the lower end parts of the liquid crystal panels 1 are not entirely soaked in the liquid crystal material 11, and only the injection ports 1a of the liquid crystal panels 1 are in touch with the liquid crystal material 11, other surface portions of the liquid crystal panels 1 than the injection ports 1a are not immersed in the liquid. Accordingly, the liquid crystal panels 1 can be swabbed and cleaned simply after the filling operation.

Upon completion of the filling operation, the elevation device 17 is moved in an opposite direction thereby to lower and rotate the liquid crystal pot 2 to return to the original state as shown in FIG. 2A and by A in FIG. 3. As a result, the groove part 6 is inclined again right downward and the liquid crystal material 11 remaining in the coils 9 and groove part 6 is nearly completely returned to the reservoir 3 through the hole 5b and cutaway 5a of the gate 5. Accordingly, a change of the liquid level of the liquid crystal pot 2 reflects correctly the amount of the liquid crystal material 11 filled into the liquid crystal panels 1. A required minimum amount of the liquid crystal material 11 can be supplemented highly accurately in this manner.

A servo motor or the like is preferably used for the elevation device 17 to control a speed and a position of the table 26 so as to prevent the liquid crystal material 11 from leaking out of the groove part 6 of the liquid crystal pot 2.

A second embodiment of the present invention will be depicted with reference to FIGS. 5–8 below.

Figure 5:
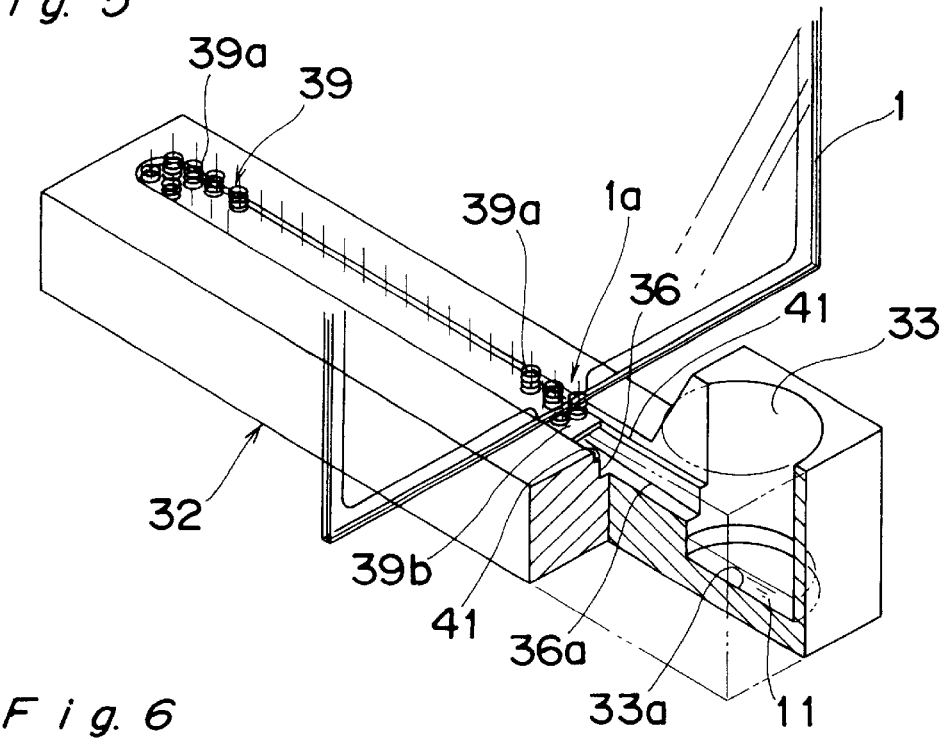
FIG. 5 is a partially-removed perspective view of accordance with a liquid crystal pot in a second embodiment of the present invention.
Figure 6:
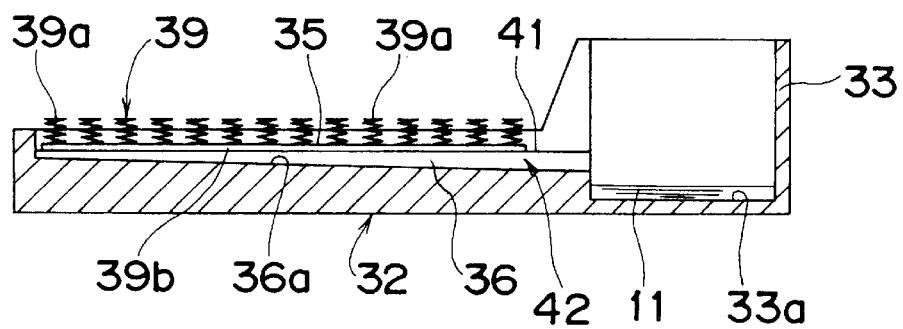
FIG. 6 is a sectional view of the liquid crystal pot of FIG. 5.
Figure 7:
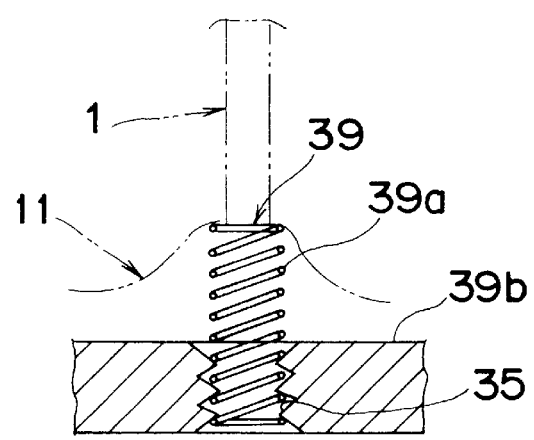
FIG. 7 is a sectional view of a medium of the pot for holding a liquid crystal material.

A liquid crystal pot 32 in FIGS. 5–7 has a liquid crystal reservoir 33 for storing the liquid crystal material 11, and a groove part 36 having a bottom face 36a higher than a bottom face 33a of the reservoir 33 and communicating with the reservoir 33. A holding medium for holding the liquid crystal material 11 is arranged in the groove part 36.

The liquid crystal reservoir 33 is circular in cross section and communicates at a part thereof with the groove part 36. The groove part 36 is moderately inclined to allow the liquid crystal material 11 therein to return to the liquid crystal reservoir 33 by its own weight.

The holding medium 39 is constituted of many coil springs 39a having top faces thereof in touch with the injection ports 1a of the liquid crystal panels 1. The coil springs 39a are screwed into screw holes 35 in a supporting plate 39b. Owing to the arrangement that the supporting plate 39b is held by stepped supporting parts 41 provided at both side faces of the groove part 36, a gap 42 is secured between the supporting plate 39b and the bottom face 36a of the groove part 36 to facilitate the circulation of the liquid crystal material 11.

The liquid crystal pot 32 is, as shown in FIGS. 6 and 8, laid horizontally at all times, and the coil springs 39a keep in the natural state the top faces thereof slightly projecting upward from upper faces of both side walls of the groove part 36.

In the vacuum chamber 19 of a liquid crystal material filling apparatus of FIG. 8 are set the above-described liquid crystal pot 32, the filling jig cassette 18 holding a plurality of liquid crystal panels 1 with the injection ports 1a faced down, an elevation device 37 for moving the liquid crystal pot 32 up and down, and a plunger 43 which can move in and out of the reservoir 33 and flows the liquid crystal material 11 to the groove part 36 from the reservoir 33 when entering the reservoir 33.

Both side parts of a bottom face of the liquid crystal pot 32 are supported horizontally by a pair of supporting plates 44. Conical recesses 45 are formed at four points of the bottom face of the liquid crystal pot 32. In the elevation device 37, a horizontal elevation table 56 is fixed to a main shaft 45 which is slidable up and down to penetrate a bottom wall of the vacuum chamber 19 hermetically. Four driving shafts 57 of an equal length are fixed to the elevation table 56 at positions corresponding to vertices of a rectangle thereof. Upper ends of these driving shafts 57 are shaped to be conical projections 58 to be fitted in the above conical recesses 45. Other reference numerals 68, 59 and 60 represent respectively a motor, a driving screw and, a nut member meshed with the driving screw 59 and coupled with the main shaft 45. The four driving shafts 57 are moved up and down by the rotation of the motor 68.

The plunger 43 is moved up and down by a plunger elevation device 61. The plunger elevation device 61 is provided with a motor 62, a driving screw 63, a nut member 64, and a main shaft 65 which air-tightly penetrates a top wall of the vacuum chamber 19 and is slidable up and down. The plunger 43 is mounted at a lower end of the main shaft 65. The plunger 43 is constructed of a main body 43a, and a stirring propeller 43b supported by the main body 43a to be movable up and down. A water-tight motor 43c for driving the stirring propeller 43b is incorporated in the plunger main body 43a. The stirring propeller 43b projects downward from a lower end of the main body 43a and is supported by the main body 43a in a floating manner. The plunger main body 43a is formed circular in cross section to be fitted with the reservoir 33. When the plunger 43 enters the reservoir 33, the liquid crystal material 11 in the reservoir 33 overflows to be sent to the groove part 36. The plunger 43 may be constituted by the floating structure shown in FIGS. 8B and 8C described above.

The operation of the above-constituted apparatus will be described now.

At first, the liquid crystal pot 32 is set on the pair of the supporting plates 44, while the plunger 43 up away from the pot 32 stands by (shown by A in FIG. 8). The vacuum chamber 19 is started to be vacuumized in this state. Since only a front face of the liquid crystal material 11 stored in the reservoir 33 is degassed in the above state, the plunger 43 is descended by the plunger elevation device 61 to insert the stirring propeller 43b into the reservoir 33. The stirring propeller 43b is then rotated to accelerate the degassing (shown by B in FIG. 8).

When the liquid crystal material 11 is sufficiently degassed and the vacuum in chamber 19 is reduced to at least about $10^{-3}$ to $10^{-4}$ Torr, the elevation device 37 starts to move the liquid crystal pot 32 upward.

Because of the upward driving of the elevation device 37, the four driving shafts 57 are moved up and, the conical projections 58 at the front ends of the shafts 57 are fitted in the conical recesses 45 in the bottom face of the liquid crystal pot 32. The liquid crystal pot 32 is consequently moved up, thereby bringing top faces of many coil springs 39a in the groove part 36 in pressed touch with the injection ports 1a of the liquid crystal panels 1. The liquid crystal pot 32 is stopped to move upward at this time point.

Meanwhile, the plunger 43 is controlled to move up before the upward movement of the liquid crystal pot 32. After the upward movement of the pot 32, the plunger 43 gradually descends relatively to the liquid crystal pot 32, so that the main body 43a enters the liquid crystal material 11 in the reservoir 33 to send the liquid crystal material 11 to the groove part 36 (indicated by C in FIG. 8).

While the top faces of the coil springs 39a are in touch with the injection ports 1a of the liquid crystal panels 1, the liquid crystal material 11 is fed to the coil springs 39a through the gap 42 and screw holes 35 of the supporting plate 39b. The liquid crystal material 11 is filled in the coil springs 39a and moreover swells at the surface thereof. The liquid crystal material 11 adhering to the periphery of the coil springs 39a due to the surface tension is filled by the capillary phenomenon to the injection ports 1a of the liquid crystal panel 1 in touch with the material 11.

After the filling operation of a fixed time by the capillary phenomenon, $N_2$ is fed into the vacuum chamber 19 to return the vacuum chamber 19 to the atmospheric pressure. The atmospheric pressure presses a liquid level of the liquid crystal pot 32 and accordingly, the liquid crystal material 11 is filled into the liquid crystal panels 1 gradually. The entire lower end portion of each of the liquid crystal panels 1 is not soaked or immersed in the liquid crystal material 11, and only the injection ports 1a of the liquid crystal panels 1 are brought in touch with the liquid crystal material 11. Since other surface portions of the liquid crystal panels 1 do not contact the liquid, the liquid crystal panels 1 can be swabbed and cleaned in a simple process after the filling operation.

After the filling operation is completed, the liquid crystal pot 32 is lowered and returned to the original position, and the plunger 43 is raised and returned to the original position. Since the plunger 43 is removed from the reservoir 33, the liquid crystal material 11 in the groove part 36 traces the inclined face and returns to the reservoir 33 by its own weight.

As shown in FIG. 2C, the width $W_2$ of an opened groove face of the groove part 6, 36 is wider than the width $W_1$ of the downward-directed face of the injection port 1a of the liquid crystal panel 1 so as not to define a gap between the opened groove face of the groove part 6, 36 and the downward-directed face of the injection port 1a of the liquid crystal panel 1. That is, if any gap is defined between them, a gas might be mixed into the liquid crystal panel 1 through the gap to deteriorate the liquid crystal panel 1. Preferably, when the liquid crystal material 11 is filled into the liquid crystal panel 1, the lower side of the liquid crystal panel 1 is not in contact with the liquid crystal material 11 and the upper faces of the side walls of the groove part 6, 36.

Figure 9:
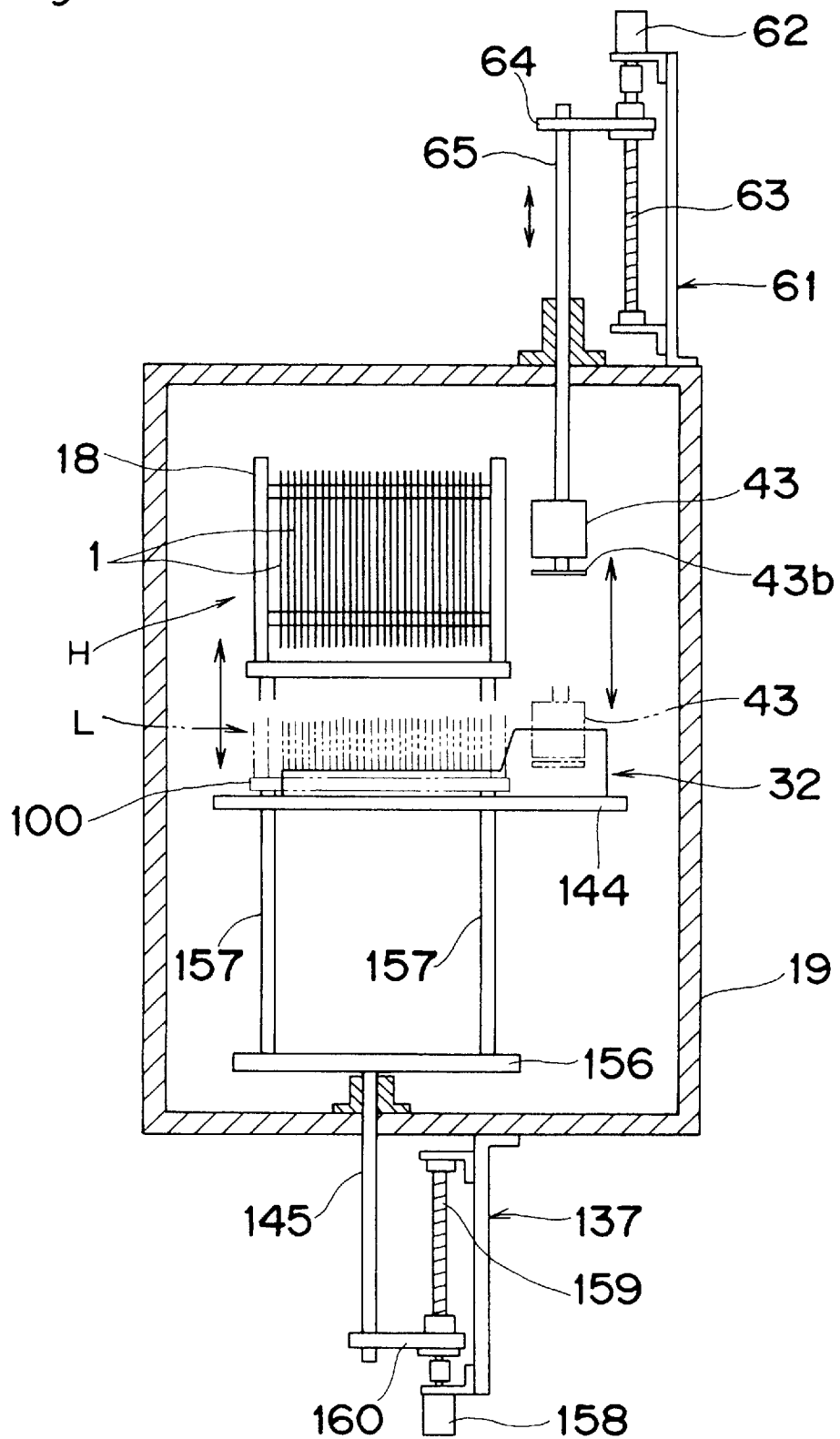
FIG. 9 is a sectional view of a liquid crystal filling apparatus in accordance with a third embodiment of the present invention.

The elevation device 37 serving as one example of the moving device for relatively moving up and down the liquid crystal pot 32 and the liquid crystal panels 11, may be constituted by a moving device 137 as shown in FIG. 9. In the moving device 137, a horizontal elevation table 156 is fixed to a main shaft 145 which is slidable up and down to penetrate a bottom wall of the vacuum chamber 19 hermetically. Four driving shafts 157 of an equal length are fixed to the elevation table 156 at positions corresponding to vertices of a rectangle.

Front ends of these driving shafts 157 are fixed to a plate 100 for supporting the jig cassette 18. Other reference numerals 158, 159 and 160 represent respectively a motor, a driving screw and, a nut member meshed with the driving screw 159 and coupled with the main shaft 145. The four driving shafts 157 are moved up and down by the rotation of the motor 158 to move up and down the liquid crystal panels 1 between position shown by solid lines H and dotted lines L with respect to the pot 32 fixed on a plate 144 to bring the springs 39 in touch with the downward-directed faces of the injection ports la of the liquid crystal panels 1.

Figure 10:
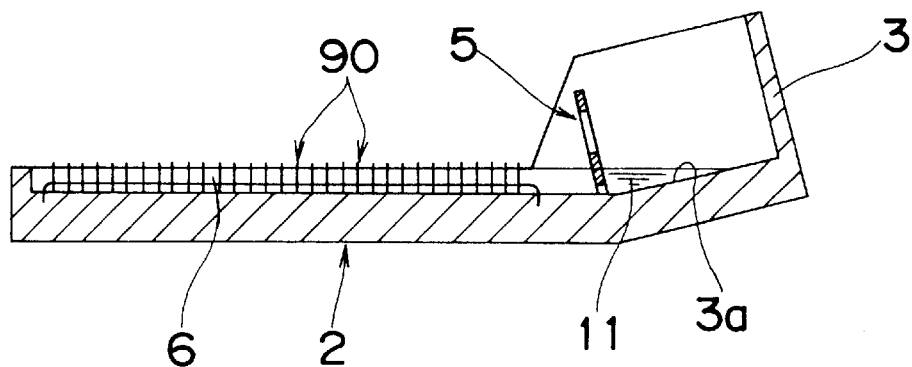
FIG. 10 is a longitudinal sectional view showing a schematic constitution in accordance with a liquid crystal pot in a fourth embodiment of the present invention.
Figure 11:
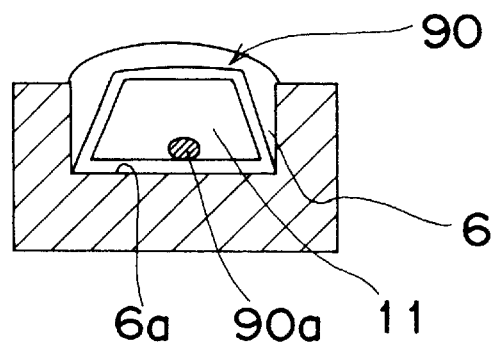
FIG. 11 is a lateral sectional view of the liquid crystal pot in the fourth embodiment of the present invention.

The medium may be formed in any shape or construction as long as the medium 9 holds the liquid crystal material 11 in contact with the downward-directed faces of the injection ports 1a of the liquid crystal panels 1. For example, as shown in FIGS. 10 and 11 as a liquid crystal pot in a fourth embodiment of the present invention, the medium may be formed by frames 90 of trapezoid shape and each of which is not connected to each other as a coil-like member. Each of the frames 90 is independently stood on the bottom face 6a of the groove part 6 and a supporting wire 90a is inserted inside the frames 90 to fix the frames 90 to the bottom face 6a of the groove part 6. The top part of each frame 90 is slightly higher than the upper faces of side walls of the groove part 6 to bring the frames 90 in touch with the downward-directed faces of the injection ports 1a of the liquid crystal panels 1.

Figure 12:
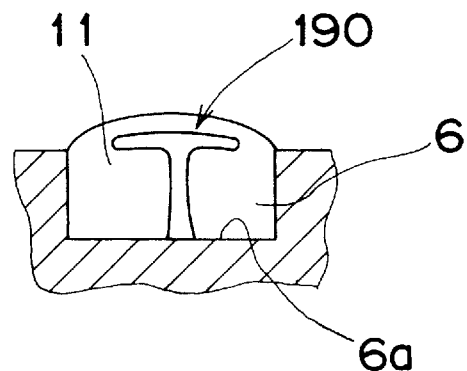
FIG. 12 is a lateral sectional view of a liquid crystal pot in accordance with a fifth embodiment of the present invention.

The shape of the medium 9 is not limited to a ring or frame shape. That is, as shown in FIG. 12 as a liquid crystal pot in a fifth embodiment of the present invention, the medium may be formed by T-shaped members 190 fixed to the bottom face 6a of the groove part 6 and having top parts thereof slightly higher than the upper faces of side walls of the groove part 6 to bring the frames 90 in touch with the downward-directed faces of the injection ports 1a of the liquid crystal panels 1.

As is described hereinabove, according to the present invention, liquid crystal panels can be swabbed and cleaned in a simple process after the filling operation. Moreover, a required minimum amount of the liquid crystal material suffices the invention with a waste eliminated.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of filling liquid crystal panels with a liquid crystal material, the method comprising:

placing a liquid crystal material holder and at least one liquid crystal panel in a vacuum chamber, wherein said liquid crystal material holder includes a reservoir and a groove part communicating with and extending from said reservoir at an angle;

moving said liquid crystal material holder relative to said liquid crystal panel such that said groove part moves from an upwardly inclined position into a horizontal position so as to cause liquid crystal material to flow from said reservoir to said groove part; and raising said liquid crystal material holder so that an injection port of said liquid crystal panel contacts a medium which is disposed in said groove part and holds liquid crystal material.

2. The method of filling liquid crystal panels with a liquid crystal material as claimed in claim 1, further comprising injecting a gas into the vacuum chamber.

3. The method of filling liquid crystal panels with a liquid crystal material as claimed in claim 1, further comprising regulating the flow of liquid crystal material between said reservoir and said groove part.

4. The method of filling liquid crystal panels with a liquid crystal material as claimed in claim 1, further comprising stirring and degassing liquid crystal material stored in said reservoir.

5. A method of filling liquid crystal panels with a liquid crystal material, the method comprising:

placing a liquid crystal material holder and a cassette holding a plurality of liquid crystal panels in a vacuum chamber, wherein said liquid crystal material holder includes a reservoir and a groove part extending from said reservoir;

moving said liquid crystal material holder upwardly toward said liquid crystal panels;

changing the posture of said groove part relative to said cassette as said liquid crystal material holder is moved toward said liquid crystal panels so as to cause liquid crystal material to flow from said reservoir into said groove part; and contacting said injection ports of said liquid crystal panels with a medium disposed in said groove part, wherein said medium holds the liquid crystal material which initially flows into said liquid crystal panels via said injection ports by capillary action.

6. The method of filling liquid crystal panels with a liquid crystal material as claimed in claim 5, wherein the medium holding the liquid crystal material comprises a plurality of coil-like members, and each of said coil-like members has a central longitudinal axis in alignment with said injection ports of said liquid crystal panels.

7. The method of filling liquid crystal panels with a liquid crystal material as claimed in claim 5, further comprising injecting a gas into the vacuum chamber.

8. The method of filling liquid crystal panels with a liquid crystal material as claimed in claim 5, further comprising regulating the flow of liquid crystal material between said reservoir and said groove part.

9. The method of filling liquid crystal panels with a liquid crystal material as claimed in claim 5, further comprising stirring and degassing the liquid crystal material which is contained in said reservoir.

10. An apparatus for filling a liquid crystal material, said apparatus comprising:

a vacuum chamber;

a liquid crystal pot having a reservoir for storing a liquid crystal material and a groove part extending from said reservoir at an angle, wherein said groove part is in communication with said reservoir for receiving liquid crystal material therefrom;

a liquid crystal holding medium disposed in said groove part;

a filling jig cassette for accommodating a plurality of liquid crystal panels having injection ports;

an elevation device for moving said liquid crystal pot upward and downward; and a posture control mechanism for switching a posture of said liquid crystal pot in accordance with upward and downward movement of said liquid crystal pot in order to cause liquid crystal material to flow from said liquid crystal reservoir into said groove part, at a raised position thereof, and bring said liquid crystal holding medium into contact with downwardly-directed faces of the liquid crystal panel injection ports.

11. The liquid crystal material filling apparatus as claimed in claim 10, further comprising a flow regulating gate, provided between said liquid crystal reservoir and said groove part, for regulating the flow of liquid crystal material between said reservoir and said groove part.

12. The liquid crystal material filling apparatus as claimed in claim 11, further comprising a stirring device for stirring and degassing liquid crystal material contained in said liquid crystal reservoir.

13. The liquid crystal material filling apparatus as claimed in claim 10, further comprising a stirring device for stirring and degassing liquid crystal material contained in said reservoir.

14. The liquid crystal material filling apparatus as claimed in claim 10, wherein said liquid crystal holding medium comprises a plurality of coils, and each of said coils has a central axis which is oriented in a direction so as to intersect said liquid crystal panel injection ports.

15. The liquid crystal material filling apparatus as claimed in claim 10, wherein said liquid crystal holding medium comprises a plurality of coil-like members, and each of said coil-like members has a top portion which is engagable with said liquid crystal panel injection ports.

16. The liquid crystal material filling apparatus as claimed in claim 5, wherein each of said coil-like members is a coil spring.

17. The liquid crystal material filling apparatus as claimed in claim 10, wherein a top portion of said liquid crystal holding medium is higher than adjacent upper surfaces of side walls of said groove part.

18. The liquid crystal material filling apparatus as claimed in claim 10, wherein said groove part defines a groove, and a width of said groove is wider than a width of a downward-directed face of said liquid crystal panel injection ports.

* * * * *